(12) United States Patent
Strasser

(10) Patent No.: US 10,174,718 B2
(45) Date of Patent: Jan. 8, 2019

(54) COMBUSTION OPERATED IMPULSE DRIVE UNIT

(71) Applicant: James Peter Strasser, Midland, MI (US)

(72) Inventor: James Peter Strasser, Midland, MI (US)

(\*) Notice: Subject to any disclaimer, the term of this patent is extended or adjusted under 35 U.S.C. 154(b) by 321 days.

(21) Appl. No.: 15/261,902

(22) Filed: Sep. 10, 2016

(65) Prior Publication Data

US 2018/0073464 A1 Mar. 15, 2018

(51) Int. Cl.
*F02K 7/06* (2006.01)
*F02C 5/06* (2006.01)
*F02C 5/02* (2006.01)

(52) U.S. Cl.
CPC .............. *F02K 7/06* (2013.01); *F02C 5/02* (2013.01); *F02C 5/06* (2013.01)

(58) Field of Classification Search
CPC ... F02K 7/02; F02K 7/06; F02K 7/067; F02C 5/02; F02C 5/06; F02C 5/08
USPC ................................ 123/465, 47 R; 60/39.8
See application file for complete search history.

(56) References Cited

U.S. PATENT DOCUMENTS

| | | |
|---|---|---|
| 1,035,454 A | 8/1912 | Lewis |
| 2,480,540 A | 8/1949 | Bodine |
| 2,512,254 A | 6/1950 | Mallory |
| 2,546,965 A | 4/1951 | Bodine |
| 2,920,444 A | 1/1960 | Jorgensen |
| 3,088,406 A | 5/1963 | Homer |
| 3,163,001 A | 12/1964 | Reilly |
| 3,520,477 A * | 7/1970 | Cooley .................. B05B 12/06 239/101 |
| 3,664,124 A * | 5/1972 | Fehler ..................... F02C 7/232 60/39.281 |
| 3,766,399 A | 10/1973 | Demetrescu |
| 4,480,611 A | 11/1984 | Wendt |
| 4,722,185 A | 2/1988 | Campbell |
| 5,111,654 A | 5/1992 | Sertich |
| 5,361,581 A * | 11/1994 | Clark ..................... F02K 5/023 60/247 |
| 5,678,522 A | 10/1997 | Han |
| 5,797,260 A | 8/1998 | Koppel et al. |
| 5,808,231 A | 9/1998 | Johnston et al. |
| 5,921,765 A | 7/1999 | Smith |
| 5,975,034 A | 11/1999 | Han |

(Continued)

FOREIGN PATENT DOCUMENTS

FR 2067429 A5 * 8/1971 ............. B63H 11/14
JP 47-95715 5/1974

*Primary Examiner* — William H Rodriguez

(57) ABSTRACT

A combustion management device for generating a thrust burst to impart a physical impulse. In operation, a combustion chamber, defined by a valve unit (33), is primed to a set pressure and fueled by fuel injectors (23). An ignitor (22) then initiates combustion. Under force of combustion, the valve unit is moved, pulling an exhaust valve (18) from an exhaust port (16), releasing combustion products as thrust. Work may be derived from the travel of the valve unit, independent of the thrust generated. After combustion, a return mechanism returns the valve unit to the start position, ready to repeat the process. Simple design, and valve operations needing little more than pressure differentials to function, make for simplified construction, and more modular applications.

20 Claims, 8 Drawing Sheets

(56) References Cited

U.S. PATENT DOCUMENTS

| | | | |
|---|---|---|---|
| 6,213,097 B1 | 4/2001 | Maucher | |
| 6,220,852 B1 * | 4/2001 | Moore | F23M 9/06 |
| | | | 239/265.19 |
| 7,464,534 B2 * | 12/2008 | Daniau | F02B 71/06 |
| | | | 123/294 |
| 8,813,474 B2 | 8/2014 | Daniau et al. | |
| 2005/0183413 A1 | 8/2005 | Kojima et al. | |
| 2012/0122039 A1 | 5/2012 | Kenyon et al. | |
| 2013/0025256 A1 | 1/2013 | Lu et al. | |
| 2017/0082069 A1 * | 3/2017 | Ruegg | F02K 1/08 |

\* cited by examiner

COMBUSTION OPERATED IMPULSE DRIVE UNIT

BACKGROUND

Prior Art

Prior art cited in this application:

| U.S. Patents | | |
| --- | --- | --- |
| Pat. No. | Issue Date | Patentee |
| 8,813,474 | 2014 Aug. 26 | Daniau, et al. |
| 5,921,765 | 1999 Jul. 13 | Smith |
| 5,797,260 | 1998 Aug. 25 | Koppel |
| 5,361,581 | 1994 Nov. 8 | Clark |
| 4,722,185 | 1988 Feb. 2 | Campbell |
| 3,163,001 | 1964 Dec. 29 | Reilly |
| 3,088,406 | 1963 May 7 | Horner |
| 2,920,444 | 1960 Jan. 12 | Jorgensen |
| 2,512,254 | 1950 Jun. 20 | Mallory |
| 2,480,540 | 1949 Aug. 30 | Bodine |
| 1,035,454 | 1912 Aug. 13 | Lewis |

The pulse jet engine is one of the simplest, and easiest to manufacture thrust generating devices. It is also a device fraught with problems. The pulse jet is inefficient, has poor thrust to size ratio, generally poor thrust characteristics which severely limit speed or applicable force, and limited options for improving compression and overall burn. U.S. Pat. No. 2,480,540, 1949, A. G. Bodine, Jr. attempts to overcome these limits by using a piston, or comparable pressure reacting device, to transfer combustion pressure to a compressor. This engine still operates on resonance, would still need a long resonance tube, and the added compression would blow a fair amount of fuel air mixture out of the appropriate combustion zone because of poor contain. Plus, the added complexity negates the simple nature of a pulse jet engine.

U.S. Pat. No. 8,813,474, 2014, E. Daniau, et al, claims a pulse detonation engine. The more immediate combustion of pulse detonation is an effort to make up for the lack of contain and compression present in a typical pulse jet engine. However the Daniau design still operates on a cycle, still necessarily employs a long fire tube, and the movable unit positioned at the combustion point is specifically designed to regulate fuel.

Other efforts work to forgo the long resonance tube of the pulse jet, while improving compression and contain. Typically, but not always, a crankshaft driven reciprocating piston compressor is used. The next five designs are indicative of this approach. But, whatever differences these designs have with regard to each other, they all need to manage the compressed air. Combustion drives the compression stage. But, combustion also occupies the combustion chamber the compressed air needs to fill. So, some way is needed to manage the gas until the chamber clears. Also, compressors need to cycle, complicating coordination of events.

A shortcoming in U.S. Pat. No. 3,163,001, 1964, J. Reilly design is a dual piston approach to defining the combustion chamber. No matter the variant, these two pistons need a mechanism to coordinate their movements. The built in delay chamber also underscores the need for compressed air management.

In U.S. Pat. No. 2,920,444, 1960, W. Jorgensen, which uses a linear reciprocating piston, the air fuel mixture is fed into an open combustion chamber. This design ultimately fires when the combustion chamber is closed. But, filling the combustion chamber with the air fuel mixture this way can lead to a number of problems, depending on the actual timing of events. The air fuel mixture can leak out the exhaust port, leaving less than the ideal maximum in the combustion chamber. The mixture can be pushed out, at least in part, by the return of the piston to its closed position. Also, the unit could misfire if fuel and air are introduced into the chamber while burn is still occurring.

U.S. Pat. No. 5,361,581, 1994, B. Clark shows a typical approach to a reciprocating pulse jet engine. The additional drawback here is the piston provides a larger workable surface to the forces of combustion than does the exhaust port. This means work preferentially goes to the piston, and so, to the full crankshaft rotation, not out as thrust. This has been a major stumbling block for all designs like this.

U.S. Pat. No. 1,035,454, 1912, I. Lewis is an earlier version of a high compression pulse jet design. It uses a two tiered piston to present a smaller workable surface to the combustion chamber. However, when the two tiered piston pulls out of the combustion chamber, the large compression piston places a draw on the combustion chamber, possibly compromising thrust and drawing in combustion product, contaminating the next charge.

In the U.S. Pat. No. 2,512,254, 1950, M. Mallory a distinct valve is used to separate the thrust combustion chamber from the compressor combustion chamber. This calls for a distinct mechanism to operate this valve. The open thrust chamber variant would be plagued with burn propagation and contain issues.

The preceding examples all operate on some form of cycle. These cycles make it difficult for these designs to have single fire or intermittent operation. Also, these designs are intricately tied to their compressors. This can have severe limitations on their form factors and design applications.

Some rocket engine designs operate on a metered out burn principle which may resemble an impulse style thrust burst. Three such units, U.S. Pat. No. 3,088,406, 1963, J. Horner, U.S. Pat. No. 4,722,185, 1988, R. Campbell, and U.S. Pat. No. 5,797,260, 1998, C. Koppel, L. Maine, all employ pistons in some form. Aside from the open combustion chamber and special fuel requirements, all three designs simply use the pistons to meter out the necessary fuel mixture for burn. Even the Koppel design, which places a piston in the combustion chamber, uses thrust to push the piston into a set fuel mixture volume to squeeze the fuel into the combustion chamber. This may produce a thrust event closer to an impulse thrust event, but these devices are clearly operationally different and would have limits typical of rockets.

U.S. Pat. No. 5,921,765, 1999, by B. Smith is a combustion management device. Aside from being attached to a specific compressed fuel/oxidizer source, the Smith design has another notable difference. The Smith design has a piston acting as an exhaust valve that is pushed by the expanding gases to release the combusted gas stream. This push open valve design does nothing to recover the work applied to it in a manner that compliments the thrust vector created. And, it would be extremely difficult, if not impossible, to modify the physical geometry and mechanisms of the Smith design to accomplish this. Also, optimizing the Smith design combustion chamber to expel the combusted products effectively and efficiently would be difficult, if not impractical.

SUMMARY

A mechanical device for generating a thrust burst, through combustion, to impart a physical impulse. Combustion drives a valve unit contained within, pulling open an exhaust valve, and releasing a thrust burst. The force spent opening the exhaust valve can be recovered in a manner complimentary to the thrust vector created. And, a specific amount of force can be metered out by the motion of the valve unit, separate from the impulse caused by thrust.

Advantages

Central to the combustion operated impulse drive unit is the valve unit, whose design provides a number of advantages. The valve unit is designed to pull open the exhaust valve, leaving the exhaust port unobstructed, and the combustion chamber more easily optimized to expel thrust. Also, the valve unit provides a means to remove work from the system in a form other than thrust. And, any force in excess of what is needed to open the exhaust valve and removed as work, the valve unit can return to the system in a manner that compliments the thrust created. Additionally, limiting the travel of the valve unit limits the amount of work removed from the system. Shorter valve unit travel makes for more thrust, but less work available from the valve unit, a longer amount of travel, the opposite. Thus, each particular version of a combustion operated impulse drive unit can be built to distribute work output in a specific manner.

Advantages are not limited to the valve unit. The combustion operated impulse drive unit can also operate with compressions many times higher than that of a pulse jet engine. Yet, it does not need a long resonant exhaust tube, greatly improving its thrust to size ratio. It has good combustible mixture contain, greatly improving burn effectiveness. Additionally, it can operate off any number of commonly available fuels. It is not intrinsically tied to any type of compressor. It can operate from a gas reservoir and a regulator. It can be positioned remote to its high compression gas source. Or, several units can draw from the same high compression gas source. Furthermore, the combustion operated impulse drive unit can fire on demand, intermittently, and in a continuous pulse fashion. Moreover, the design is simple. A simplicity that translates to its manufacture. It employs a more modular approach. This allows each supporting component to be designed more specifically for the task at hand. Plus, the simple, modular like design allows for numerous modifications, both internal and external, without changing the substantive nature of the combustion operated impulse drive unit. This makes it more adaptable to design requirements. And, the work output options encourage innovative approaches other design would not. These are just a few of the advantages.

DRAWINGS

Drawings—Reference Numerals

| | | | |
|---|---|---|---|
| 11) | Housing | 12) | Combustion Chamber |
| 13) | Intake Channel | 14) | Chamber Inlet |
| 15) | Inlet Valve | 16) | Exhaust Port |
| 17) | Piston | 18) | Exhaust Valve |
| 19) | Exhaust Valve Support Shaft | 20) | Auxiliary Shaft. |
| 21) | Forward Return Spring | 22) | Ignitor |
| 23) | Fuel Injector | 24) | Stop |
| 25) | Main Inlet | 26) | Piston Face |
| 27) | Piston Guide | 28) | Piston Back |
| 29) | Valve Spring | 30) | Valve Guide |
| 31) | Inlet Valve Seat | 32) | Auxiliary Shaft Port |
| 33) | Valve Unit | 34) | Adaptable Connection |

DETAILED DESCRIPTION

Figure 2:
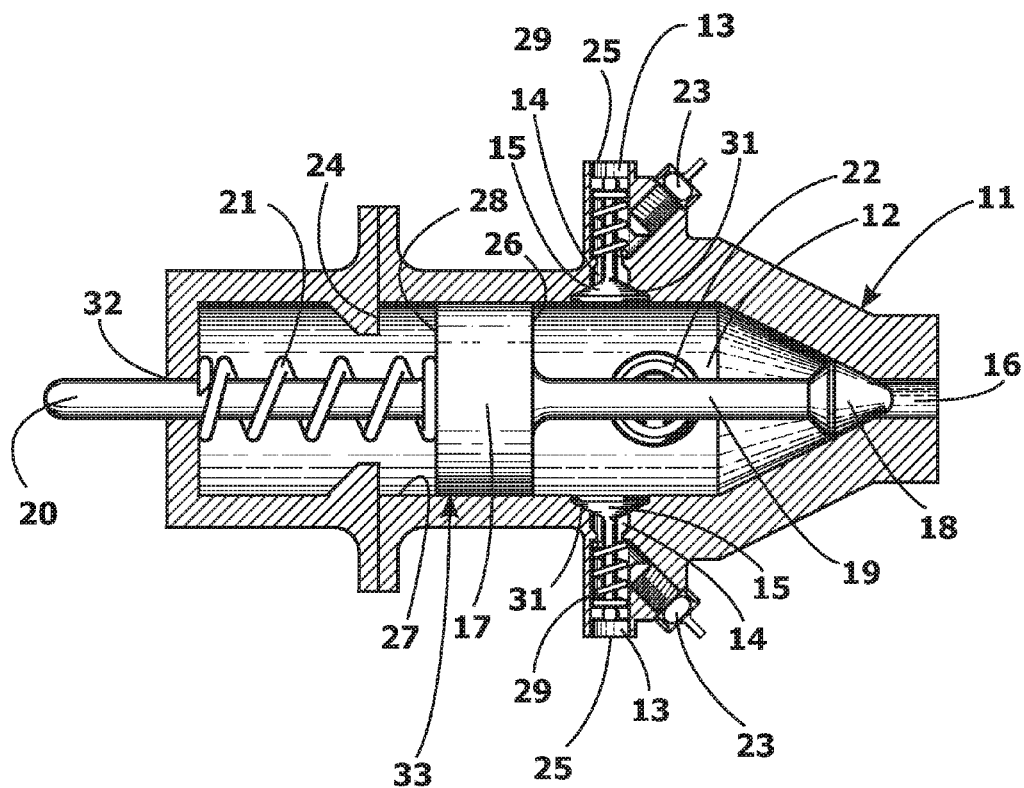
FIG. 2 shows a cut away view of one embodiment.

FIG. 2, 8, also 1, 3, and 4

The combustion operated impulse drive unit maintains a practical seal, releasing gas only when operated. Central to that operation is a Valve Unit 33. The valve unit consists of an Exhaust Valve 18, a Piston 17, and an Exhaust Valve Support Shaft 19 which connects the piston to the exhaust valve. The exhaust valve support shaft rigidly keeps the exhaust valve and piston no closer than a predetermined distance apart, and appropriately limits separation as the exhaust valve travels with the piston. The piston has two sides, a Piston Face 26, which adjoins the exhaust valve support shaft, and a Piston Back 28, which may adjoin an Auxiliary Shaft 20, as is the case in FIG. 2. The valve unit sets in a Housing 11. The housing contains a continuous void, made up of three distinct parts: a Piston Guide 27, a Combustion Chamber 12, and an Exhaust Port 16. The combustion chamber is between the piston guide and the exhaust port. The exhaust port is directly opposite the piston guide and communicates with the outside environment through one end of the housing. The piston section of the valve unit resides in the piston guide, oriented to project the exhaust valve and exhaust valve support shaft into the combustion chamber. The fit of the piston in the piston guide makes for a gas tight seal, and allows for a continuously effective gas tight seal as the piston travels through the piston guide in a freely repeatable motion between a forward most position and a backward most position. Tight fit and sufficient surface contact between the piston and the piston guide also stabilizes the valve unit allowing continuously precise orientation of the exhaust valve support shaft through this repeated travel. Seal and function of the piston may be improved with commonly known modifications.

The forward most position and the backward most position are travel limits imposed when the valve unit contacts points within the housing. The forward most position defines the combustion chamber 12. At this point the piston seals one end of the combustion chamber and is held at the predetermined distance from the exhaust valve. The exhaust valve 18, driven by a recovery force applied to the piston back, firmly seats into and seals the exhaust port 16, sealing the other end and making the volume between the piston face 26 and the exhaust valve the combustion chamber. Additionally, the piston face has sufficient surface area and inclination as to be the only practical workable surface area presented to the combustion chamber. So, any high pressure event in the combustion chamber preferentially works the piston. The backward most position occurs when the piston back 28 impacts a Stop 24. At impact, any force vector in the valve unit transfers fully and directionally to the stop, and so, to the housing in kind.

Figure 1:
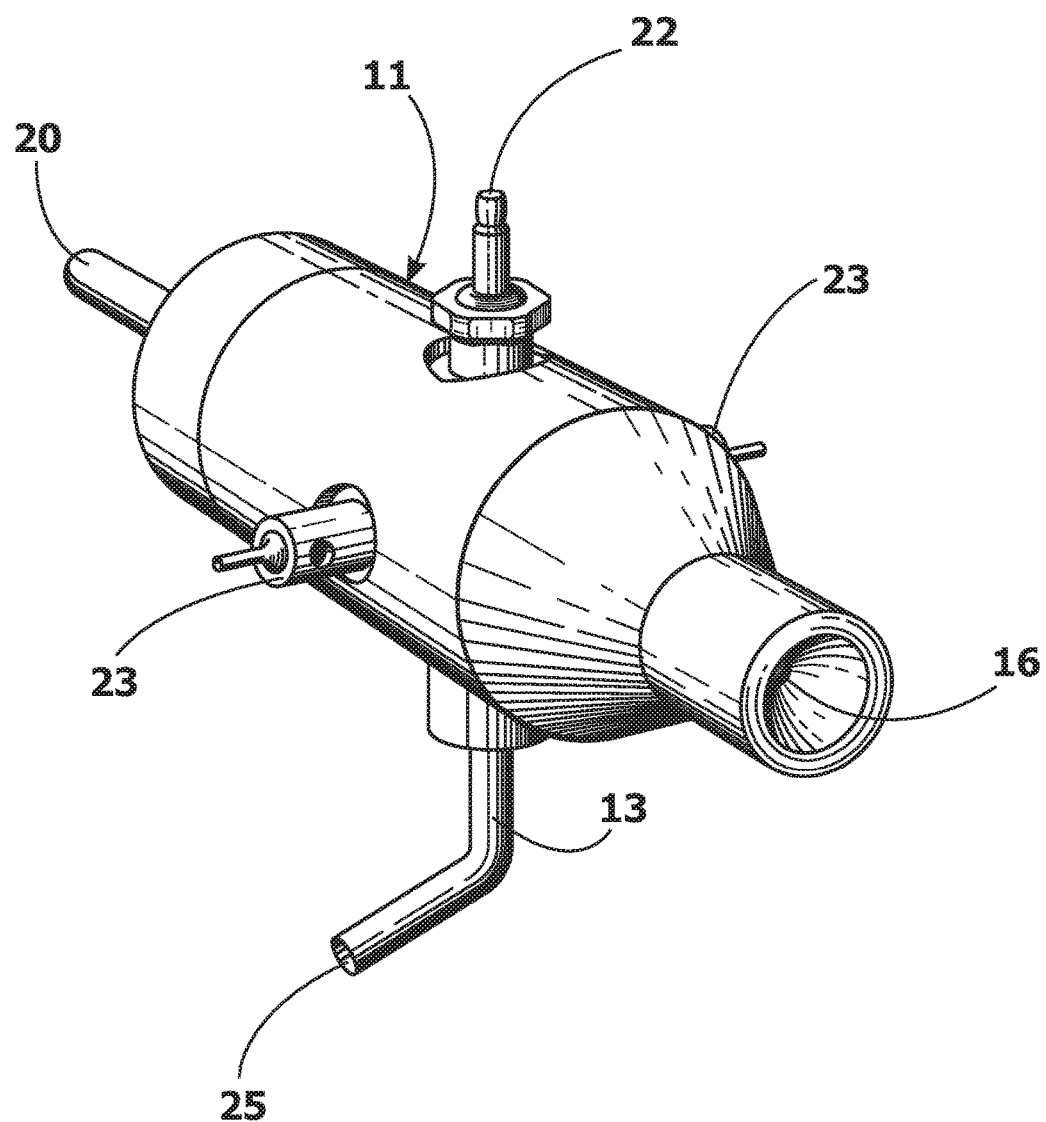
FIG. 1 shows a perspective view of one embodiment.
Figure 3:
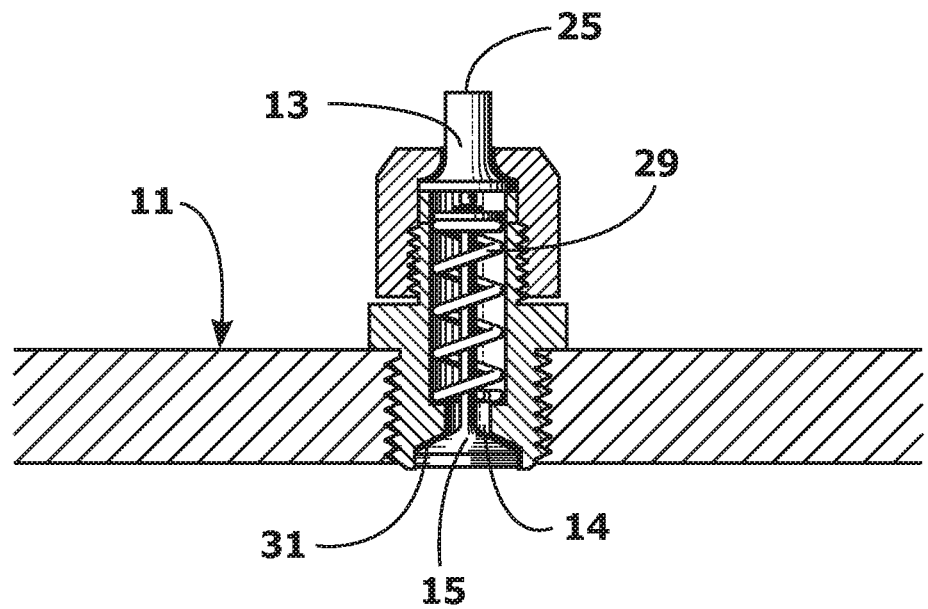
FIG. 3 shows a detailed cut away view of one embodiment of an assisted closed inlet valve.
Figure 4:
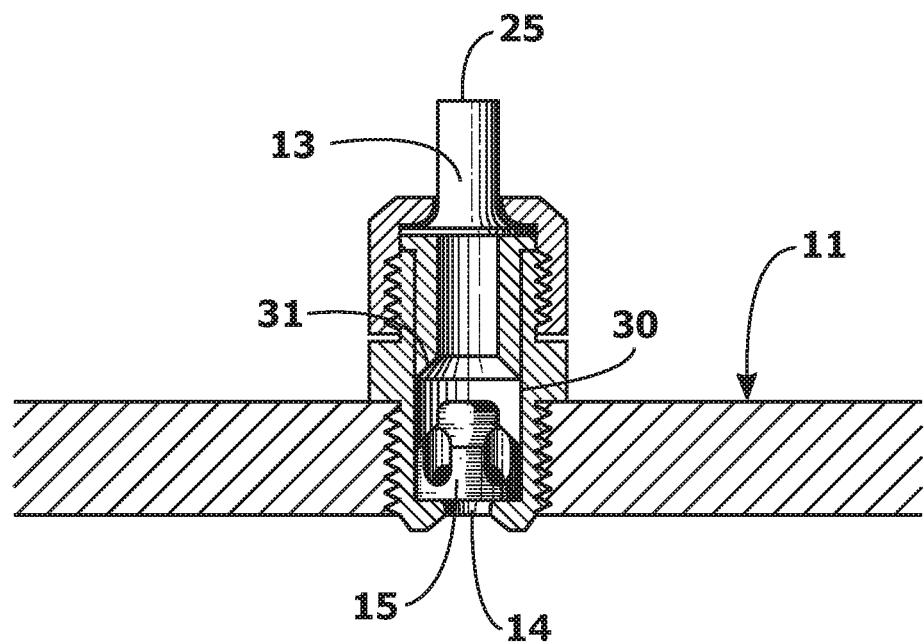
FIG. 4 shows a detailed cut away view of one embodiment of a forced closed inlet valve.

Main Inlets 25 receive a compressed gas from an external source and transfer that gas through the housing, via Intake Channels 13, to the Chamber Inlets 14. The intake channels are leak free conduits for this compressed gas. Positioned at the chamber inlets are Inlet Valves 15. Inlet valves come in predominately two forms: assisted closed, and forced closed. FIG. 4 details a forced closed inlet valve, whereas FIG. 2 and FIG. 3, detail an assisted closed inlet valve. Assisted closed valves employ a Valve Spring 29 to bring the inlet valve to an Inlet Valve Seat 31. Forced closed use a Valve Guide 30. Whatever the form, inlet valves behave as check valves operating on a pressure differential, appropriately allowing high pressure gas to flow into the combustion chamber to fill for burn, and blocking the high pressure combustion products from leaking back into the intake channel. Fuel Injectors 23 are positioned to inject an appropriate amount of fuel into the intake channels, close to the chamber inlet. FIG. 1 shows an embodiment with fuel injectors mounted in the housing, positioned to inject directly into the combustion chamber. Wherever position, fuel injectors must mount so that the necessary seal integrity of the system is maintained.

Also mounted in the housing is the Ignitor 22. FIG. 2 shows only one ignitor. However, if the cutaway view of FIG. 2 was a mirror image of the cutaway portion, the whole unit would have two ignitors. Ignitors contact the contents of the combustion chamber and extend through the housing, without comprising the seal integrity of the housing, to receive an external signal to initiate combustion. FIG. 1 shows an external view of an ignitor, represented in the form of a spark plug, although ignitors may take various forms.

A Forward Return Spring 21 resides between the piston back and an internal portion of the housing, directly opposite of the exhaust port. The forward return spring applies a recovery force to the piston back, driving the valve unit to the forward most position when pressure in the combustion chamber becomes sufficiently low. This forward action not only reseats the exhaust valve, sealing the combustion chamber, but maintains that seal as the combustion chamber fills to operational pressure. The forward return spring is just an example of a forward return mechanism. Other mechanisms can accomplish the same result. And, particular applications may call for a more particular mechanism.

An auxiliary shaft 20 is positioned counter to the exhaust valve support shaft 19 and separated from the exhaust valve support shaft by the piston. The auxiliary shaft interacts with the valve unit, but may not be attached to it, as shown in FIG. 8. In FIG. 2, the auxiliary shaft is connected to the valve unit and extends out of the housing via Auxiliary Shaft Port 32. This arrangement allows force to be transferred from the valve unit to an external device as work, and allows force, such as from an external forward return mechanism, to be transferred to the valve unit. In this version, the auxiliary shaft acts as a retainer and a guide for the forward return spring. Also, the fit of the auxiliary shaft port may provide additional support to the auxiliary shaft, and, the whole valve unit. The auxiliary shaft, however, is optional. There may be no need for these functions in the application. Or, devices other than an auxiliary shaft may meet these functions.

Figure 8A:
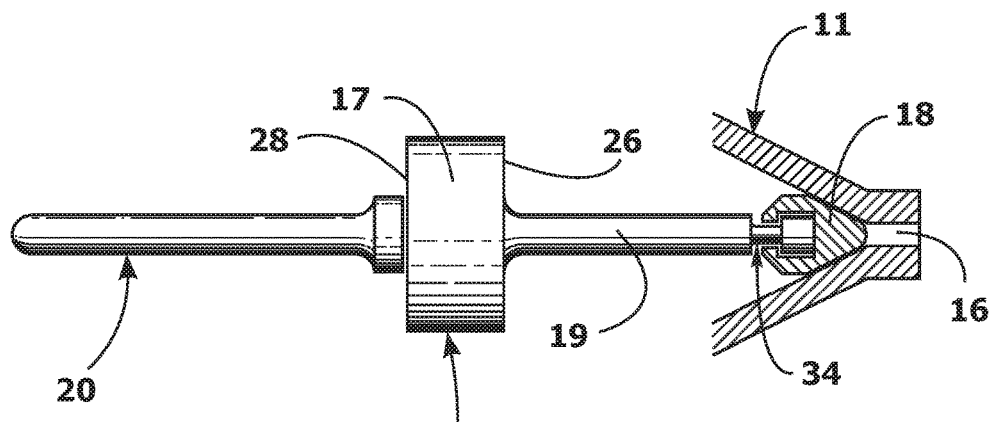
FIGS. 8A and 8B shows an unattached auxiliary shaft and a valve unit with one possible version of an adaptable exhaust valve.
Figure 8B:
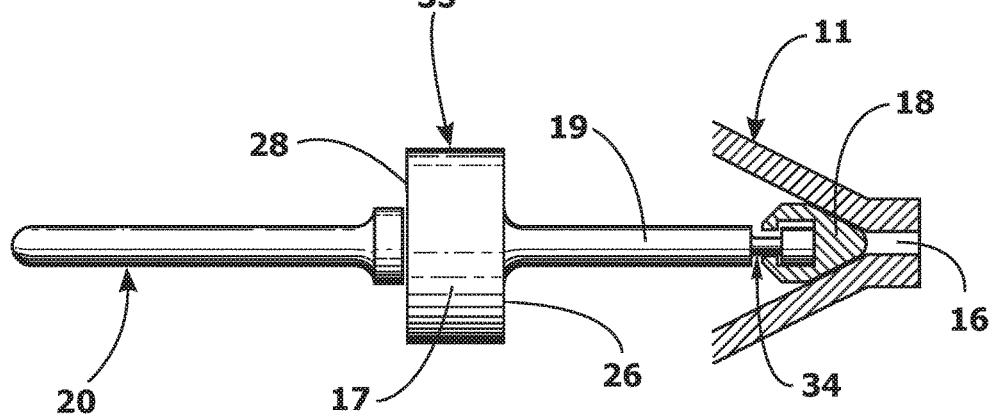

FIG. 8 shows one way of compensating for inaccuracies in some components. FIG. 8A shows the exhaust valve support shaft 19, the exhaust valve 18, and the exhaust port 16 in ideal alignment. FIG. 8B, shows the exhaust valve support shaft out of alignment, but because of an Adaptable Connection 34, the exhaust valve conforms to the exhaust port, properly seating and creating a seal.

FIG. 8 also shows an auxiliary shaft not connected to the valve unit. The space between the auxiliary shaft and the valve unit may exist if the only function is to remove work. If this version is involved in the forward return mechanism, contact is expected throughout most of the interaction. This separate valve unit and auxiliary shaft would fit into the housing much the same way as does the continuous valve unit in FIG. 2.

FIG. 2 is just one embodiment. Aside from the typical changes in size or part dimensions, other variation are expected. For example, the size and number of intake channels can vary, perhaps to improve gas flow into the combustion chamber. Number and size of inlet valves are dictated by the intake channels. All main inlets will most likely draw from the same high compression gas source. Number, modest placement variations, and type of ignitors will be effected by desired burn and combustion chamber pressures. Multiple ignitors will most likely fire simultaneously. Number, type, and placement of fuel injectors will be effected by a number of issues, but directed to get the appropriate amount of fuel, well mixed, into the combustion chamber at the time operational pressure is achieved. The exhaust port will be adjusted to its particular application, but nozzles, and possibly redirects may be used. The exhaust valve support shaft 19 may not be a shaft. None of these form factor variations, however, lead to anything functionally different. Instead, underscore a level of adaptability.

Operation—FIGS. 5, 6, 7 Reference to Parts can be Aided by 2, 3, and 4

Figure 5A:
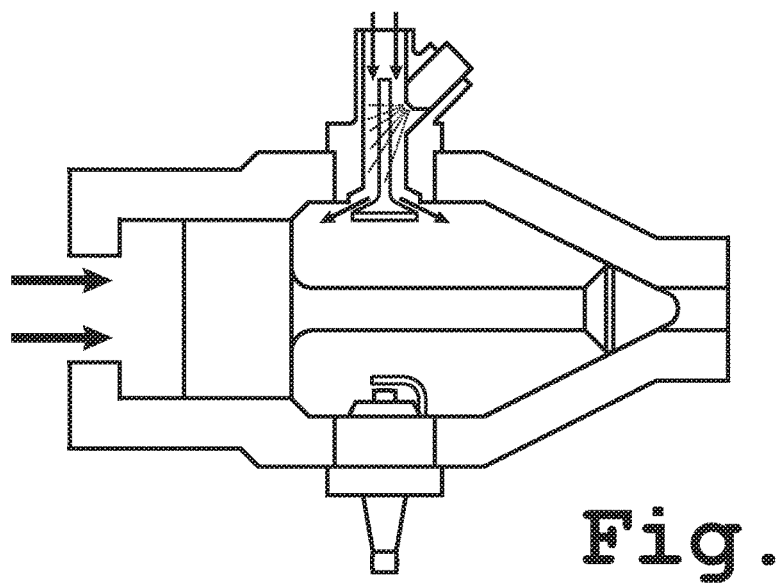
FIG. 5A through 5D represent stages of operation for the combustion operated impulse drive unit.
Figure 5B:
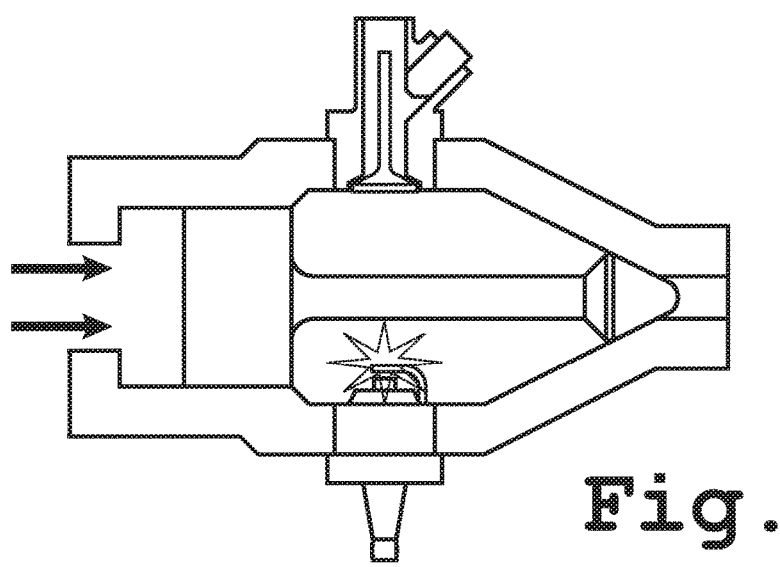

Operation can be considered to have four stages: an intake stage, an ignition stage, a burn stage, and a recovery stage. Underlying these stages are set conditions. First, operational pressure is a predetermined pressure. Next, the appropriate amount of fuel can be calculated from a given predetermined pressure, and the combustion chamber volume defined at the forward most position. Finally, the recovery force has to be sufficient enough and continually applied so that the combustion chamber can fill to operational pressure without breaking the seal between the exhaust valve and exhaust port. Where applicable, in supporting drawings lines with arrow heads are used to show gas flow and/or force direction. In FIG. 5A, fuel injection is depicted as lines of dots. In FIG. 5B, the ignition event is represented as a star like outline.

The intake stage, as shown in FIG. 5A, starts with the valve unit held at the forward most position by the recovery force, and the exhaust valve 18 appropriately seated in the exhaust port 16, effectively sealing the gas contents of the combustion chamber from the exhaust port. Compressed gas, introduced at the main inlet 25 from an external source, flows through the intake channel 13, pushing open the inlet valve 15, and streaming into the combustion chamber. A fuel injector 23 injects an appropriate amount of fuel into that compressed gas stream, in full and sufficiently before the combustion chamber reaches operational pressure, thus ensuring a completely contained combustible mix within the combustion chamber.

FIG. 5B illustrates the ignition stage. With operational pressure achieved, pressure in the combustion chamber approximately equals that of the intake channel. The combustion chamber has essentially become a static environment with nothing going in or out. At this point an ignition source, like a spark from the ignitor 22, ignites the combustible mix.

Figure 5C:
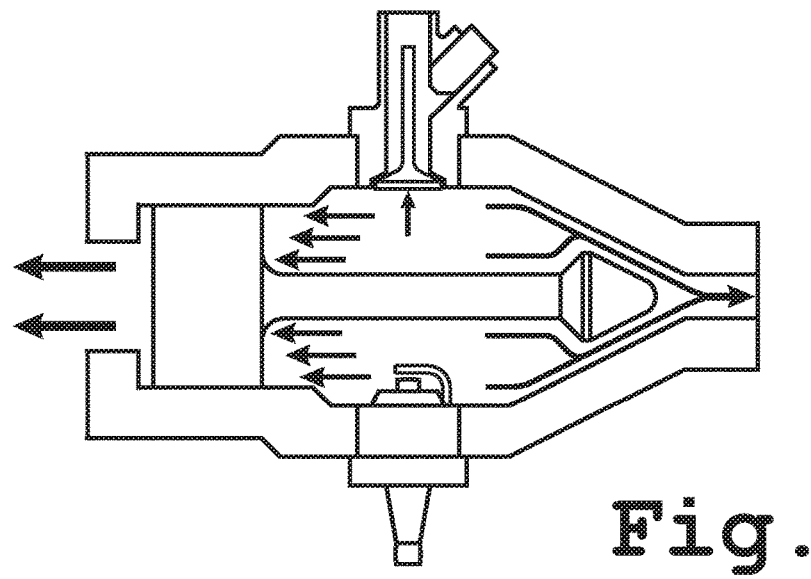
Figure 5D:
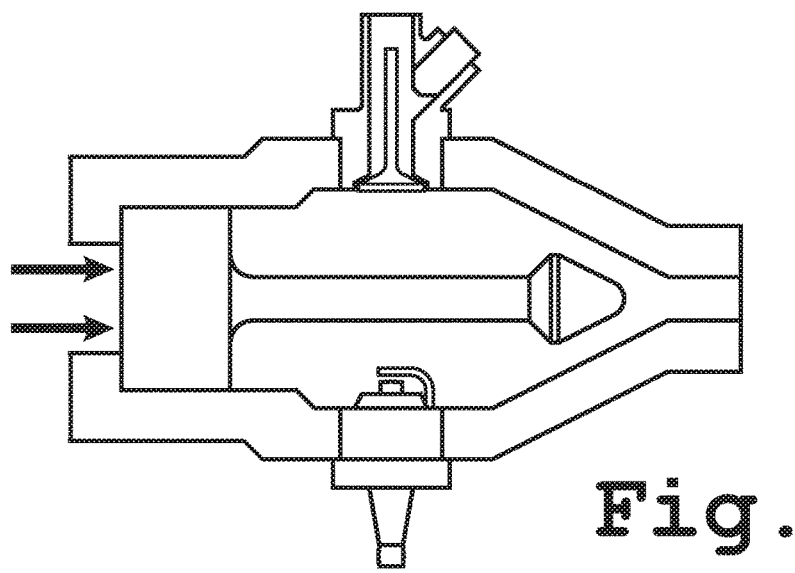

FIG. 5C illustrates the burn stage. After the ignition event, burn propagates and hot gases expand. Force of expansion seats the inlet valve and drives the piston backwards through the piston guide 27. The seated inlet valve seals the intake channel from the contents of the combustion chamber. And, the action of the piston moves the exhaust valve support shaft 19, pulling the exhaust valve from the exhaust port. Unimpeded, the combusted gases escape as thrust through the open exhaust port. The piston ultimately bumps into the stop 24, transferring an impact force, the direct linear opposite of the thrust vector created, to the housing 11. In FIG. 5C, two arrows are positioned near the piston back 28 to represent the force available there as a result of combustion FIG. 5D illustrates the recovery stage. Once the thrust has been expelled and force from pressure in the combustion chamber falls sufficiently below the force of the forward return mechanism, the valve unit is pushed forward. The exhaust valve seats back into the exhaust port and the unit is ready to execute the intake stage again. The force could come from a forward return spring 21, but is generalized as arrows to show that it does not need to be from any particular source.

Figure 6A:
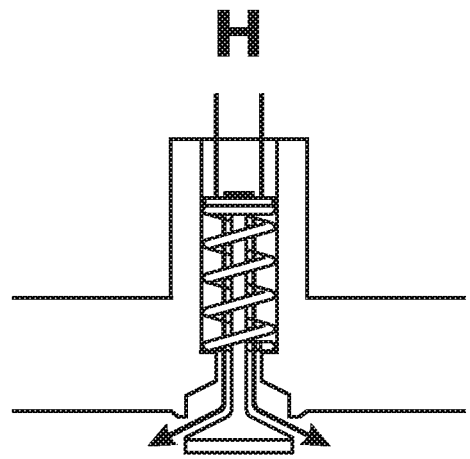
FIG. 6A through 6C represent operational concepts of an assisted closed inlet valve.
Figure 6B:
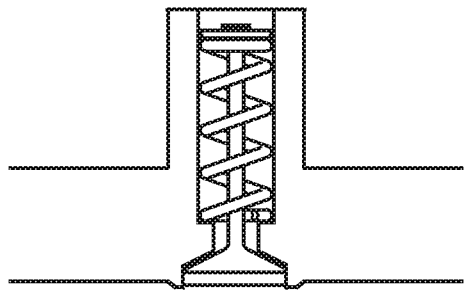
Figure 6C:
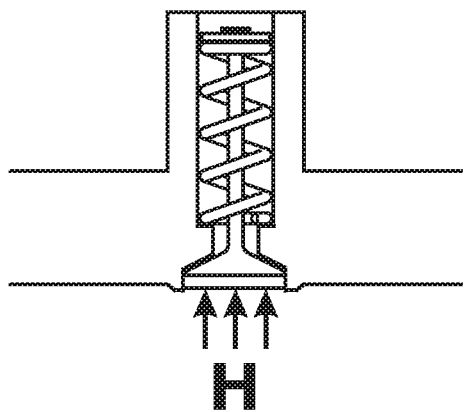
Figure 7A:
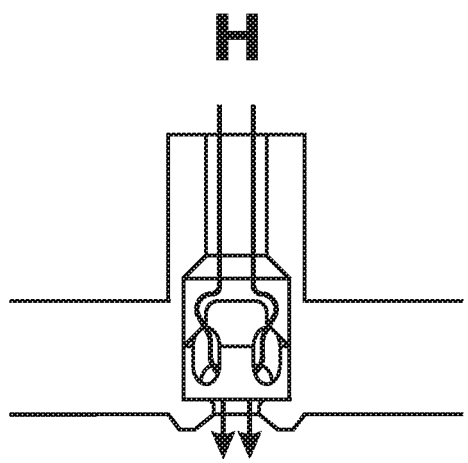
FIG. 7A through 7C represent operational concepts of a forced closed inlet valve
Figure 7B:
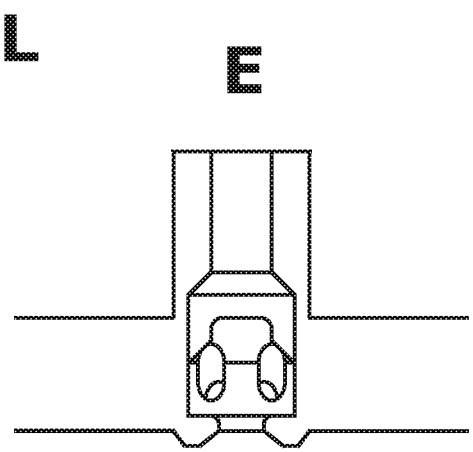
Figure 7C:
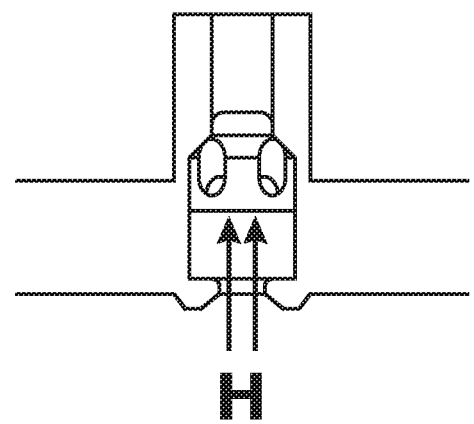

In FIG. 6 and FIG. 7, H denotes the high pressure side, L the low pressure side, and E nearly equal pressure. Typically, inlet valves will be of two types, forced closed and assisted closed. FIG. 6 illustrates the operation of an assisted closed valve, FIG. 7, a forced closed valve. Both valve types operate on a pressure differential between the intake channel 13 and the combustion chamber. When high pressure is on the intake side, both valves are forced open, as shown in FIG. 6A and FIG. 7A. When the pressure differential is about equal, the assisted closed valve is helped closed, FIG. 6B. The forced close valve remains open, FIG. 7B. When combustion produces high pressure in the combustion chamber, the resulting force more firmly seats an already closed assisted closed valve, FIG. 6C. In contrast, combustion drives the forced closed inlet valve along the valve guide 30 into the inlet valve seat 31, effectively closing that valve, FIG. 7C.

Slight variations of operation are possible. A combustible mixture can be introduced at the main inlet 25 instead of using fuel injection. However, fuel injection into, or as near to the combustion chamber 12 as possible offers operational advantages. Fuel can be introduced before compressed gas flow begins so long as the compressed gas scavenges and mixes fuel as it enters the combustion chamber. Injecting fuel after reaching operational pressure is also possible, but necessitates injection into the combustion chamber, more specialized injectors, and has operational disadvantages. The type of fuel and compressed gas used can vary. As long as an appropriate combustion supporting compressed gas can be matched with the appropriate fuel effectively, operational parameters would remain the same. Typically, air is matched with a liquid or gas based hydrocarbon. Also, an external control to coordinate the four stages is implied, not shown. Such a device is application specific, but commonly known devices and technology could easily be adapted without changing the underlying operation. Forward return mechanisms, work removal, and auxiliary shafts can be implemented in a multitude of ways. No matter the form, or complexity, taking force from or return force to the valve unit is the essence. So, examples given are not to be construed as limits.

The invention claimed is:

1. A mechanical device for generating a thrust burst through combustion as a means to impart a physical impulse comprising:
   a. a valve unit contained within a housing with said valve unit comprised of a piston, an exhaust valve, and an exhaust valve support which connects said piston to said exhaust valve in a manner which rigidly keeps said piston and said exhaust valve no closer than a predetermined distance apart and appropriately limits separation of said piston and said exhaust valve,
   b. wherein said housing resides a combustion chamber, a piston guide, and an exhaust port which combine to make a continuous void within said housing with said exhaust port communicating to external environments through one end of said housing directly opposite said piston guide and with said piston guide and said exhaust port separated by said combustion chamber,
   c. where said piston resides in said piston guide such that said exhaust valve and said exhaust valve support of said valve unit project into said combustion chamber, and where said piston fits into said piston guide so as to form a substantially gas tight seal between said piston and said piston guide, and in a manner which allows said piston to travel with a continuously effective gas tight seal along said piston guide between a forward most position and a backward most position in a freely repeatable fashion, and where said forward most position and said backward most position are travel limits imposed by contact made by said valve unit,
   d. where said forward most position positions said valve unit such that said exhaust valve seats in said exhaust port in a manner that substantially forms a gas tight seal between said exhaust valve and said exhaust port thus appropriately sealing any gas content of said combustion chamber from said exhaust port and where said forward most position brings said piston and said exhaust valve to said predetermined distance apart,
   e. where said piston has a piston back which is fashioned to make appropriate contact with a stop when said valve unit is at said backward most position, and where said stop is connected to said housing and oriented such that any vector force applied to said stop by said piston back is transferred to said housing in kind,
   f. where travel of said valve unit from said forward most position to said backward most position pulls said exhaust valve from said exhaust port an appropriate distance into said combustion chamber to effectively allow evacuation of combusted product from said combustion chamber,
   g. where said piston has a piston face positioned towards said combustion chamber such that said piston face substantially defines one end of said combustion chamber when said valve unit is at said forward most position and where said piston face is of sufficient surface area and inclination as to be worked upon by forces from high pressure contained within said combustion chamber,
   h. an intake channel which operates as a substantially leak free conduit to transfer an appropriate combustion supporting compressed gas from a source outside said housing, through said housing, and into said combustion chamber,
   i. an inlet valve positioned in stream of said intake channel and substantially at a point where said intake channel meets said combustion chamber and such that said inlet valve operates on a pressure differential between said intake channel and said combustion chamber in a manner to substantially check gas flow out of said combustion chamber and into said intake channel when forces directed from said combustion chamber onto said inlet valve exceed forces on said inlet valve directed from said intake channel and allows gas flow into said combustion chamber from said intake channel when forces directed from said intake channel onto said inlet valve exceed forces on said inlet valve directed from said combustion chamber, j. a fuel delivery mechanism to assure said combustion chamber contains an appropriate amount of fuel mixed with said appropriate combustion supporting compressed gas in a combustible fashion prior to ignition, k. an ignitor which mounts in said housing in a manner that appropriately maintains seal integrity and positioned so as to protrude into said combustion chamber sufficiently as to provide an ignition source to a combustible mixture of said appropriate combustion supporting compressed gas and said appropriate amount of fuel contained within said combustion chamber and such that said ignitor communicates through said housing so as to receive an external signal to initiate said ignition source, l. a forward return mechanism which applies a recovery force to said piston back to hold said valve unit at said forward most position with sufficient force as to seat said exhaust valve into said exhaust port, sealing said exhaust port from said combustion chamber, and where said recovery force continuously holds said valve unit at said forward most position and continuously maintains any such resulting seal between said exhaust valve and said exhaust port as pressure in said combustion chamber rises to, and substantially equals, said predetermined pressure, and where said recovery force returns said valve unit to said forward most position when pressure in said combustion chamber becomes sufficiently low.

2. A mechanical device for generating a thrust burst through combustion as defined in claim 1 wherein said piston has sufficient surface to apply to said piston guide stabilizing orientation of said valve unit through repeated travel between said forward most position and said backward most position and further therein any force vector applied to said valve unit and as guided by said piston guide as a result of a high pressure event occurring in said combustion chamber is a direct linear opposite of any thrust vector directed by said exhaust port from same said high pressure event.

3. A mechanical device for generating a thrust burst through combustion as defined in claim 1 further including an adaptable connection between said exhaust valve and said exhaust valve support allowing better seal conformity when said exhaust valve seats in said exhaust port at said forward most position.

4. A mechanical device for generating a thrust burst through combustion as defined in claim 1 further including a number of said intake channels and such that for each said intake channel of said number of said intake channels, said inlet valve is disposed in stream of said intake channel.

5. A mechanical device for generating a thrust burst through combustion as defined in claim 1 further including a number of said ignitors.

6. A mechanical device for generating a thrust burst through combustion as defined in claim 1 wherein said fuel delivery mechanism is comprised of a fuel injector positioned to inject said appropriate amount of fuel for combustion in a manner that places said appropriate amount of fuel into said combustion chamber substantially in full and in a sufficiently mixed state for combustion with said appropriate combustion supporting compressed gas before said appropriate combustion supporting compressed gas fills said combustion chamber to said predetermined pressure needed for combustion, and where mounting of said fuel injector appropriately maintains necessary seal integrity.

7. A mechanical device for generating a thrust burst through combustion as defined in claim 6 wherein said fuel delivery mechanism is comprised of a number of said fuel injectors.

8. A mechanical device for generating a thrust burst through combustion as defined in claim 1 further including a mechanism to remove work from said valve unit as a combustive force causes said valve unit to travel from said forward most position to said backward most position and in a manner that makes such removed work available to external devices.

9. A mechanical device for generating a thrust burst through combustion as defined in claim 1 further including an auxiliary shaft positioned so as to interact with said piston back and such that said auxiliary shaft is oriented counter to said exhaust valve support and separated from said exhaust valve support by said piston.

10. A mechanical device for generating a thrust burst through combustion as defined in claim 9 wherein said auxiliary shaft is fully connected to said piston back and extends through an auxiliary shaft port embedded in said housing with a portion of said auxiliary shaft extending outside said housing by way of said auxiliary shaft port making said auxiliary shaft available to impart work on to an external device, and where said auxiliary shaft port sets opposite said exhaust port with said auxiliary shaft held sufficiently rigid in said auxiliary shaft port as to impart additional stability to said valve unit without unnecessarily impeding travel of said valve unit, and where also said auxiliary shaft acts as a retainer and guide for a spring where said spring is positioned between said piston back and an internal portion of said housing directly opposed to said exhaust port and where said spring acts as said forward return mechanism.

11. A combustion operated mechanical device designed to release a thrust burst to generate a physical impulse comprising:

a. a housing containing a piston guide, a combustion chamber, and an exhaust port which combine to form a continuous void within said housing, with said combustion chamber positioned between said piston guide and said exhaust port, and with said piston guide directly opposite of said exhaust port and where said exhaust port extends through one end of said housing communicating with environments external to said housing, b. a valve unit comprised of a piston, an exhaust valve, and an exhaust valve support which connects said exhaust valve to said piston in a manner which rigidly keeps said piston and said exhaust valve no closer than a predetermined distance apart and limits separation of said piston and said exhaust valve an appropriate amount, c. where said piston resides in said piston guide with such a fit as to form a substantially gas tight seal between said piston and said piston guide and such that said fit allows said piston to maintain a continuously effective gas tight seal while traveling along said piston guide in a freely repeatable fashion, and where such containment of said piston in said piston guide orients said valve unit so as to project said exhaust valve support and said exhaust valve into said combustion chamber, d. where travel along said piston guide by said piston is limited to a forward most position and a backward most position and where said forward most position seats said exhaust valve in said exhaust port in a manner that forms an appropriate gas tight seal between said exhaust valve and said exhaust port and with said piston and said exhaust valve at said predetermined distance apart when at said forward most position, e. where said combustion chamber is defined by said continuous void between said piston guide and said exhaust port and by said valve unit when said valve unit is at said forward most position, f. an intake channel to transfer an appropriate combustion supporting compressed gas from an external compressed gas source, through said housing, and into said combustion chamber, in a substantially leak free fashion, and where such a transfer is regulated by an inlet valve placed in line of said intake channel and substantially at a point where said intake channel and said combustion chamber meet and such that said inlet valve, operating on a pressure differential between said intake channel and said combustion chamber, substantially checks gas flow out of said combustion chamber and into said intake channel when gas pressure inside said combustion chamber appropriately exceeds gas pressure in said intake channel and allows gas flow into said combustion chamber from said intake channel when gas pressure in said intake channel appropriately exceeds gas pressure in said combustion chamber, g. a fuel delivery mechanism to introduce an appropriate amount of fuel mixed in a combustible fashion into said combustion chamber prior to ignition, h. an ignitor which mounts in said housing in a manner that appropriately maintains seal integrity and positioned so as to protrude into said combustion chamber sufficiently as to provide an ignition event to a combustible mixture of said appropriate combustion supporting compressed gas and said appropriate amount of fuel contained within said combustion chamber and such that said ignitor communicates through said housing so as to receive an external signal to initiate said ignition event, i. where said piston has a piston face exposed to said combustion chamber and where said piston face is of sufficient surface area and inclination as to provide a workable surface to forces from pressure in said combustion chamber, where said workable surface provides a means for sufficient force from pressure in said combustion chamber to drive said valve unit through said piston guide towards said backward most position thus providing a means for pulling said exhaust valve from said exhaust port, j. where said backward most position is a travel limit for said valve unit imposed by a stop, and also where said piston has a piston back, positioned opposite of said piston face, with said piston back designed to contact said stop as a means for transferring any force vector imparted onto said valve unit by pressure in said combustion chamber to said stop in kind, and where said stop is connected to said housing as means for transferring any force vector imparted onto said stop to said housing in kind, k. with operational starting conditions having said valve unit substantially at said forward most position and pressure in said combustion chamber sufficiently lower than pressure from said external compressed gas source making for said pressure differential between said intake channel and said combustion chamber and causing said appropriate combustion supporting compressed gas to flow from said external compressed gas source through said intake channel and into said combustion chamber and pressurizing said combustion chamber to a predetermined pressure needed for combustion, l. where said fuel delivery mechanism is fashioned to deliver said appropriate amount of fuel, substantially in full and substantially mixed with said appropriate combustion supporting compressed gas, in a manner that allows said combustion chamber to reach said predetermined pressure needed for combustion with an effectively contained combustible mix within said combustion chamber prior to said ignition event, m. where said ignition event occurs when said ignitor receives said external signal and conditions, such as said combustion chamber reaching said predetermined pressure needed for combustion and said effectively contained combustible mix within said combustion chamber, are sufficiently met, so that when said ignitor initiates combustion within said combustion chamber burn propagates in an effort to combust said effectively contained combustible mix creating a high pressure event within said combustion chamber, n. where said high pressure event within said combustion chamber places force on said workable surface of said piston face greater than forces restraining travel of said valve unit driving said valve unit through said piston guide to said stop, and such that when said high pressure event drives said valve unit from said forward most position to said backward most position said valve unit pulls said exhaust valve sufficiently far enough into said combustion chamber to allow any resulting combustion products to escape through said exhaust port substantially unimpeded as thrust, additionally said high pressure event places force on said inlet valve causing said inlet valve to seat effectively and as such, substantially prevents combustion products from entering said intake channel, o. a forward return mechanism which applies a recovery force to said piston back to hold said valve unit at said forward most position with sufficient force as to seat said exhaust valve into said exhaust port, sealing said exhaust port from said combustion chamber, and where said recovery force continuously holds said valve unit at said forward most position and continuously maintains any such resulting seal between said exhaust valve and said exhaust port as pressure in said combustion chamber rises to, and substantially equals, said predetermined pressure, and where said recovery force returns said valve unit to said forward most position when pressure in said combustion chamber becomes sufficiently low.

12. A combustion operated mechanical device as defined in claim 11 wherein said piston has sufficient surface to apply to said piston guide as to provide a means for stabilizing orientation of said valve unit through repeated travel between said forward most position and said backward most position and further therein any force vector applied to said valve unit and as guided by said piston guide as a result of said high pressure event is a direct linear opposite of any thrust vector directed by said exhaust port caused by same said high pressure event.

13. A combustion operated mechanical device as defined in claim 11 further including an adaptable connection between said exhaust valve and said exhaust valve support as a means for better seal conformity when said exhaust valve seats in said exhaust port at said forward most position.

14. A combustion operated mechanical device as defined in claim 11 further including a number of said intake channels and such that said inlet valve is in line with each said intake channel of said number of said intake channels.

15. A combustion operated mechanical device as defined in claim 11 further including a number of said ignitors.

16. A combustion operated mechanical device as defined in claim 11 wherein said fuel delivery mechanism is comprised of a fuel injector positioned advantageously as a means for injecting said appropriate amount of fuel for combustion in a manner that places said appropriate amount of fuel into said combustion chamber substantially in full and in a sufficiently mixed state for combustion with said appropriate combustion supporting compressed gas before said appropriate combustion supporting compressed gas fills said combustion chamber to said predetermined pressure needed for combustion, and where mounting of said fuel injector appropriately maintains necessary seal integrity.

17. A combustion operated mechanical device as defined in claim 16 wherein said fuel delivery mechanism is comprised of a number of said fuel injectors.

18. A combustion operated mechanical device as defined in claim 11 further including a mechanism to remove work from said valve unit as said valve unit travels from said forward most position to said backward most position under force of combustion and that makes such removed work available to external devices.

19. A combustion operated mechanical device as defined in claim 11 further including an auxiliary shaft positioned counter to said exhaust valve support and separated from said exhaust valve support by said piston and which interacts with said piston back such that when said valve unit moves from said forward most position to said backward most position said auxiliary shaft is moved.

20. A combustion operated mechanical device as defined in claim 19 whereby such a configuration of said auxiliary shaft provides a means for work to be transferred from said valve unit by way of said auxiliary shaft, also whereby such a configuration of said auxiliary shaft provides a means for force to be transferred to said valve unit by way of said auxiliary shaft, and also whereby such a configuration of said auxiliary shaft provides a means for support of a mechanism regulating function of said valve unit.

* * * * *